US010087861B2

(12) United States Patent
Omran et al.

(10) Patent No.: US 10,087,861 B2
(45) Date of Patent: Oct. 2, 2018

(54) ENGINE SPEED SECONDARY ANTI-WINDUP PID CONTROLLER FOR AN AUTOMOTIVE PRODUCTIVITY MANAGER (71) Applicant: CNH Industrial America LLC, New Holland, PA (US)

(72) Inventors: Ashraf Mohammed Kandeel Omran, Clarendon Hills, IL (US); Brian Allen Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 159 days.

(21) Appl. No.: 15/167,359

(22) Filed: May 27, 2016

(65) Prior Publication Data
US 2017/0198656 A1 Jul. 13, 2017

Related U.S. Application Data (60) Provisional application No. 62/277,408, filed on Jan. 11, 2016.

(51) Int. Cl.
*F02D 31/00* (2006.01)
*F02D 41/10* (2006.01)
*F02D 29/02* (2006.01)
*F02D 41/26* (2006.01)
*F02D 41/14* (2006.01)

(52) U.S. Cl.
CPC ............. *F02D 41/10* (2013.01); *F02D 29/02* (2013.01); *F02D 31/002* (2013.01); *F02D 41/26* (2013.01); *F02D 2041/1409* (2013.01)

(58) Field of Classification Search
CPC .... F02D 31/001; F02D 31/002; F02D 31/003; F02D 31/007; F02D 31/008; F02D 2041/1409
USPC ................................ 123/350, 352, 356, 361
See application file for complete search history.

(56) References Cited

U.S. PATENT DOCUMENTS

| 4,401,075 | A | * | 8/1983 | O'Keefe, Jr. | .......... | B60K 26/04 123/352 |
| 4,419,729 | A | * | 12/1983 | Krieder | .................. | B60K 26/04 123/352 |
| 4,498,016 | A | * | 2/1985 | Earleson | ................ | B60K 28/16 290/14 |
| 4,936,274 | A | * | 6/1990 | Kozlov | ................. | F02D 31/007 123/350 |
| 5,323,746 | A | * | 6/1994 | Best | ...................... | F02D 31/001 123/357 |

(Continued)

Primary Examiner — Erick Solis
(74) Attorney, Agent, or Firm — Rickard K. DeMille; Rebecca L. Henkel (57) ABSTRACT A method for maintaining an engine speed of an engine of a work vehicle includes sending a requested parameter indicative of the engine speed to an engine controller of the work vehicle. The method also includes receiving a measured parameter indicative of the engine speed. The method further includes determining whether the requested parameter is different from the measured parameter. The method also includes setting a controller-requested parameter indicative of the engine speed based at least in part on the requested parameter and the measured parameter. The method further includes sending the controller-requested parameter to the engine controller. The method accounts for speed and torque saturation in order to avoid windup in the controller.

19 Claims, 8 Drawing Sheets (56) References Cited

U.S. PATENT DOCUMENTS

| | | | |
|---|---|---|---|
| 5,605,130 A * | 2/1997 | Dykstra | F02D 31/007 123/361 |
| 5,697,339 A * | 12/1997 | Esposito | F02D 31/007 123/357 |
| 6,085,725 A * | 7/2000 | Goode | F02D 11/105 123/357 |
| 6,119,063 A | 9/2000 | Hieb et al. | |
| 6,349,700 B1 | 2/2002 | Buckland et al. | |
| 6,424,906 B1 | 7/2002 | Zhu et al. | |
| 6,721,643 B1 | 4/2004 | Hanggi et al. | |
| 6,766,776 B2 | 7/2004 | Jiang et al. | |
| 7,536,992 B1 | 5/2009 | Wieshuber et al. | |
| 8,063,602 B2 | 11/2011 | Zhang et al. | |
| 8,224,540 B2 | 7/2012 | Dix et al. | |
| 8,527,165 B2 | 9/2013 | Steinlage et al. | |
| 9,139,096 B2 | 9/2015 | Morris | |
| 2010/0233555 A1 | 9/2010 | Zirkel et al. | |
| 2012/0173005 A1* | 7/2012 | Peterson | F02D 41/0215 700/44 |
| 2012/0191275 A1* | 7/2012 | Clever | B60K 31/00 701/21 |
| 2013/0166171 A1 | 6/2013 | Hartman et al. | |
| 2013/0297109 A1 | 11/2013 | Nefcy et al. | |
| 2014/0188354 A1 | 7/2014 | Guo et al. | |

* cited by examiner

ENGINE SPEED SECONDARY ANTI-WINDUP PID CONTROLLER FOR AN AUTOMOTIVE PRODUCTIVITY MANAGER

This application claims priority to and benefit from U.S. Provisional Application No. 62/277,408 to Prasse et al. filed Jan. 11, 2016, and incorporates the entirety of the same by reference herein.

BACKGROUND

The present disclosure relates generally to improving operation of a vehicle. In particular, the present disclosure relates to maintaining an engine speed of the vehicle close to a requested engine speed (e.g., by an operator of the vehicle).

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a method for maintaining an engine speed of an engine of a work vehicle includes sending a requested parameter indicative of the engine speed to an engine controller of the work vehicle. The method also includes receiving a measured parameter indicative of the engine speed. The method further includes determining whether the requested parameter is different from the measured parameter. The method also includes setting a controller-requested parameter indicative of the engine speed based at least in part on the requested parameter and the measured parameter. The method further includes sending the controller-requested parameter to the engine controller.

In a second embodiment, a system of a work vehicle includes an engine and a controller that includes an engine controller communicatively coupled to the engine. The controller, in operation, sends a requested parameter indicative of engine speed to the engine controller. The controller, in operation, also receives a measured parameter indicative of engine speed. The controller, in operation, further sets a controller-requested parameter indicative of engine speed based at least in part on the requested parameter and the measured parameter. The controller, in operation, also sends the controller-requested parameter to the engine controller.

In a third embodiment, a controller of a work vehicle includes an engine controller communicatively coupled to an engine of the work vehicle. The controller also includes a processor communicatively coupled to the engine controller, wherein the controller, in operation, determines whether a requested parameter indicative of engine speed is different from a measured parameter indicative of engine speed. The controller also, in operation, sets a controller-requested parameter indicative of engine speed based at least in part on the requested parameter and the measured parameter. The controller further, in operation, sends the controller-requested parameter to the engine controller.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to improving operation of a vehicle (e.g., a work vehicle). In particular, in cases where engine speed of the vehicle decreases from a requested engine speed, such as when the vehicle operates with a high load, it may be desirable to maintain the engine speed close to the requested engine speed. Accordingly, systems and methods are disclosed in which an anti-windup proportional-integral-differential (PID) algorithm is used to maintain the engine speed close to the requested engine speed. In particular, one embodiment of the present disclosure includes a method for maintaining an engine speed of an engine of a work vehicle that includes sending a requested parameter indicative of the engine speed to an engine controller of the work vehicle. The method also includes receiving a measured parameter indicative of the engine speed. The method further includes determining whether the requested parameter is different from the measured parameter. The method also includes setting a controller-requested parameter indicative of the engine speed based at least in part on the requested parameter and the measured parameter. The method further includes sending the controller-requested parameter to the engine controller.

Figure 1:
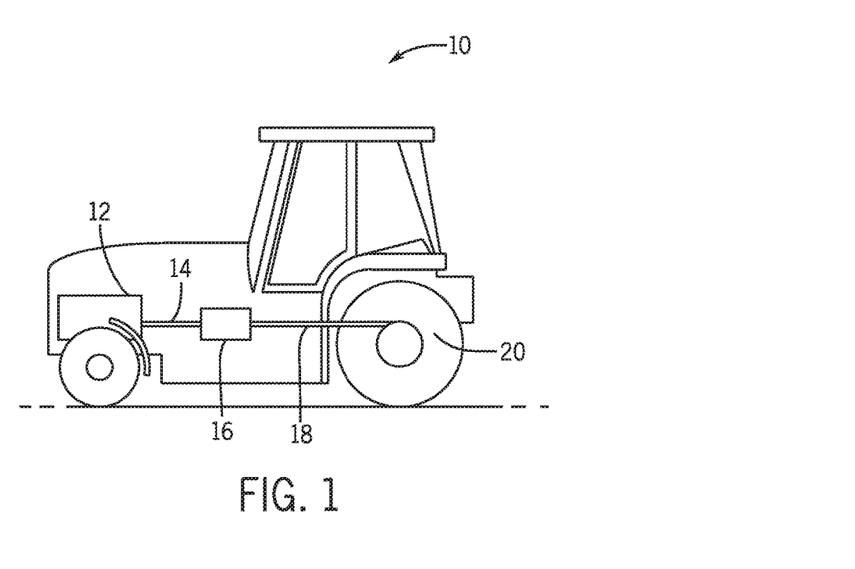
FIG. 1 is a diagram of a tractor, in accordance with an embodiment of the present disclosure.

FIG. 1 is a diagram of a vehicle (e.g., a tractor 10), that includes an engine 12, a power input shaft 14, a transmission 16, and a power output shaft 18, in accordance with an embodiment of the present disclosure. The engine is coupled to the power input shaft 14 and may provide power to rotate the power input shaft 14. The transmission 16 is coupled to the power input shaft 14 and the power output shaft 18, such that the transmission 16 may transmit power from the power input shaft 14 to the power output shaft 18 (e.g., a vehicle drive shaft). The power output shaft 18 may power wheels 20 of the tractor 10.

Figure 2:
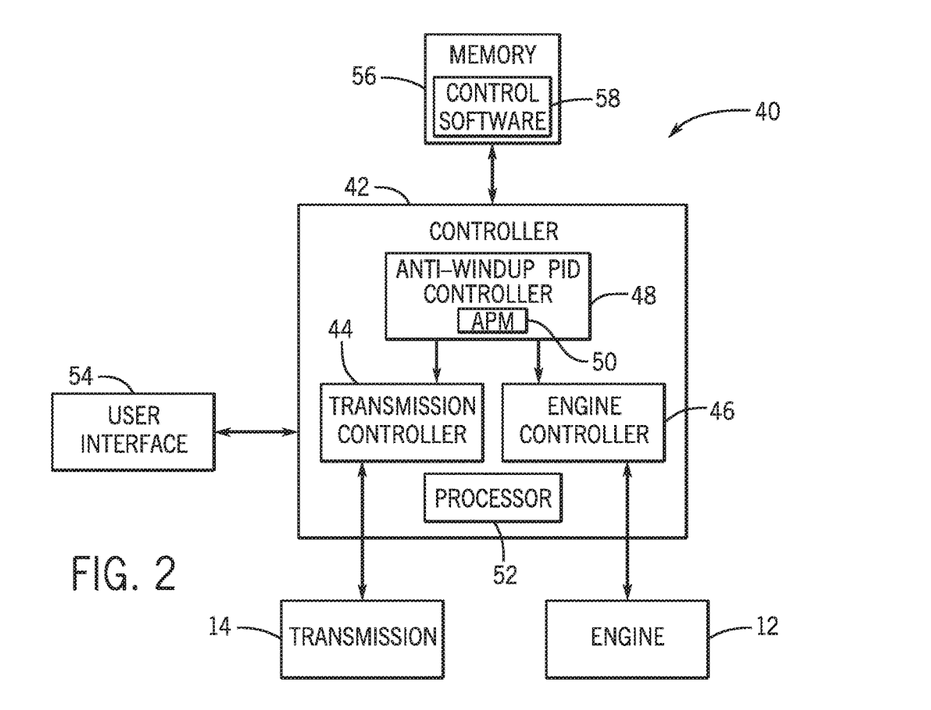
FIG. 2 is a block diagram of a control system that may be employed with the tractor of FIG. 1, in accordance with an embodiment of the present disclosure.

FIG. 2 is a block diagram of a control system 40 that may be employed within the tractor 10 of FIG. 1, in accordance with an embodiment of the present disclosure. The control system 40 includes a controller 42 that may output and receive signals to control the components of the tractor 10. The controller 42 may include a transmission controller 44 that controls the transmission 16 by instructing changes in gears or gear ratios of the transmission 16. The controller 42 may include an engine controller 46 that controls the engine 12 (e.g., by engaging and/or disengaging a throttle of the engine 12) to establish a desired speed of the engine 12. In some embodiments, one or both of the transmission controller 44 and engine controller 46 may not be separate controllers, but instead incorporated with the controller 42.

The controller 42 may include an anti-windup proportional-integral-differential (PID) controller 48 that is a control loop feedback mechanism. The PID controller 48 may include an automotive productivity manager (APM) 50. The APM 50 is a machine function that may select a transmission gear ratio (e.g., by directly communicating with the transmission 16 or via the transmission controller 44) and request an engine speed (e.g., by directly communicating with the engine 12 or via the engine controller 46) to operate the tractor 10 at a vehicle speed selected by an operator. The APM 50 may also operate while reducing fuel consumption.

The controller 42 may include a processor 52 (e.g., a microprocessor) that may execute software, such as software for controlling the tractor 10. Moreover, the processor may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors. The controller 42 may be coupled to a memory device 56 that may store information such as control software 58, look up tables, configuration data, etc. In some embodiments, the memory device 56 may be internal to the controller 42. The memory device 56 may include a volatile memory, such as random access memory (RAM), and/or a nonvolatile memory, such as ROM. The memory device 56 may store a variety of information and may be used for various purposes. For example, the memory device 56 may store processor-executable instructions (e.g., firmware or software) for the processor 52 execute, such as instructions for controlling the tractor 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data. The control software 58 may be executed by the processor 52 to control the tractor 10. In some embodiments, the APM 50 may be external to the controller 42. For example, the APM 50 may be a software program that is part of the control software 58 stored in the memory 56.

In the illustrated embodiment, the control system 40 includes a user interface 54 that may include input devices (e.g., pedals, a driver-actuated shift control, a throttle control, etc.) and output devices (e.g., indicators that provide vehicle information to an operator).

The APM 50 may select a transmission gear ratio and request an engine speed to operate the tractor at a vehicle speed selected by an operator. When a load on the engine 12 is high, the engine speed of the tractor 10 may decrease from the engine speed requested by the operator. The result may be a loss of vehicle speed and/or an inability to downshift because the load is not approximately 100 percent of a desired or maximum load.

Figure 3:
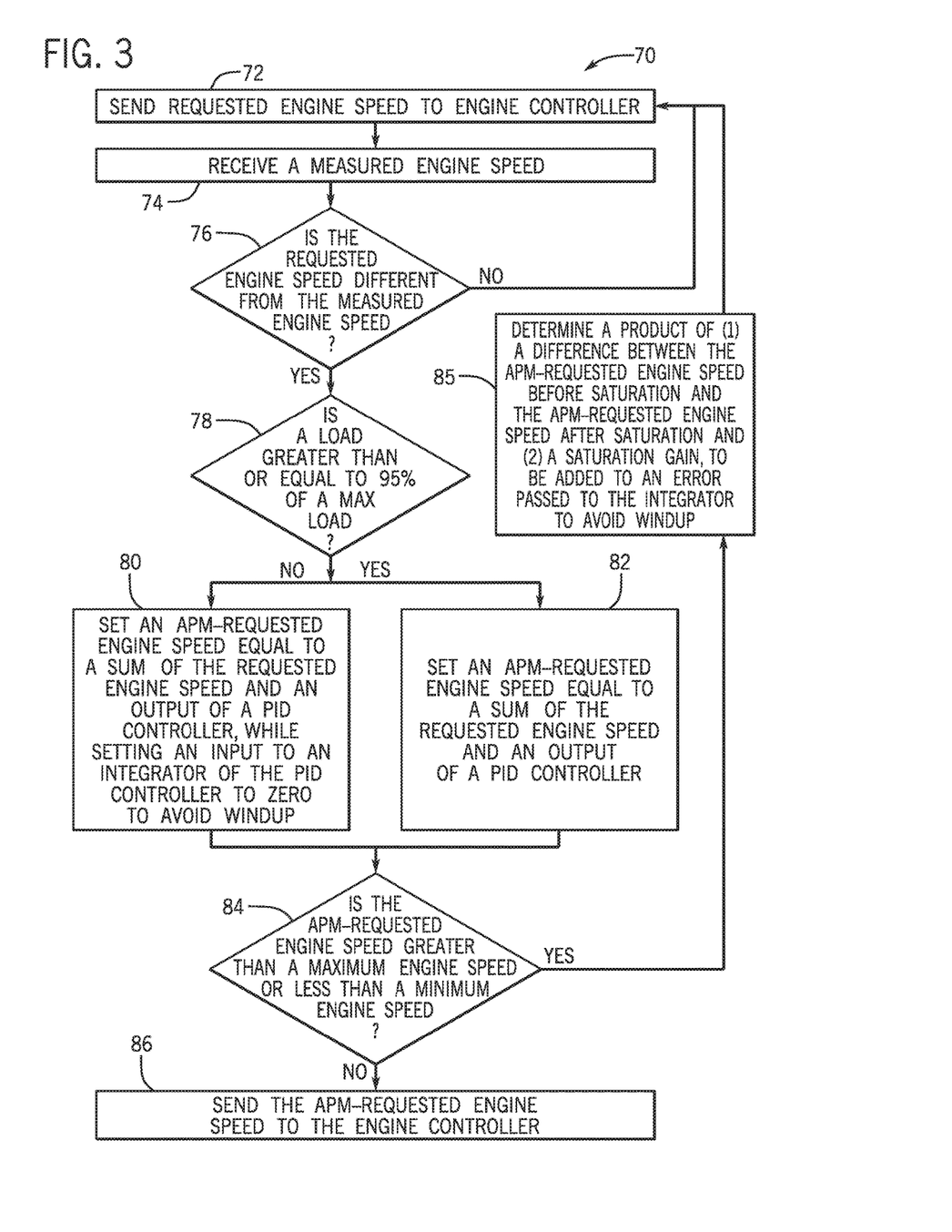
FIG. 3 is a flow diagram of a method that illustrates an anti-windup proportional-integral-differential (PID) algorithm that may be employed the control system of FIG. 2, in accordance with an embodiment of the disclosure.
Figure 4:
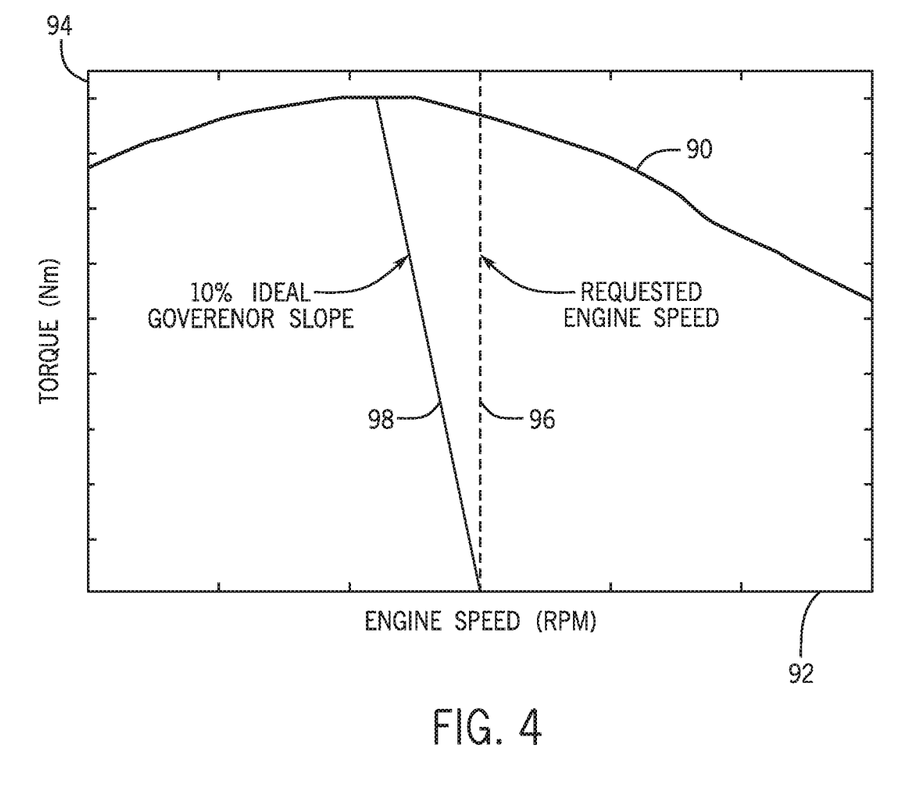
FIG. 4 is a plot of a governor slope that may be employed by an engine controller of the tractor of FIG. 1, in accordance with an embodiment of the present disclosure.

FIG. 3 is a diagram of a method 70 that illustrates an anti-windup PID algorithm that may be employed by the PID controller 48 to reduce a loss of vehicle speed when the load on the engine 12 is high, in accordance with an embodiment of the disclosure. The PID controller 48 may send (block 72) a requested parameter indicative of engine speed (e.g., a requested engine speed) to the engine controller 46. References to the requested engine speed may be considered applicable to the requested parameter indicative of engine speed. The requested engine speed may be requested by, for example, an operator of the tractor 10. The engine controller 46 may ideally employ a governor slope 90 as shown in FIG. 4. FIG. 4 includes a horizontal axis 92 representing engine speed in revolutions per minute (RPM) and a vertical axis 94 representing torque in Newton-meters (Nm). FIG. 4 illustrates the requested engine speed 96 and a 10 percent ideal governor slope. As the load on the engine 12 increases, the engine speed decreases until the engine torque reaches a desired or maximum torque (corresponding to 100 percent of the load), followed by implementation of a downshift algorithm.

The PID controller 48 may also receive (block 74) a measured parameter indicative of engine speed (e.g., a measured engine speed). References to the measured engine speed may be considered applicable to the measured parameter indicative of engine speed. The measured engine speed may be determined by a sensor of the engine 12. In some embodiments, a sensor attached to the power input shaft 14 may be employed to determine the measured engine speed. The measured engine speed may be sent by the engine controller 46 to the PID controller 48.

If the requested engine speed is different from the measured engine speed (node 76), the method returns to block 72. In some embodiments, determining whether the requested speed is different from the measured engine may include exceeding a threshold difference. For example, the threshold difference may be 1, 5, 10, or any suitable RPM, such that the requested engine speed is only different from the measured engine speed if the difference exceeds 1, 5, 10, or the suitable RPM. Otherwise, the PID controller 48 may set an APM-requested parameter indicative of engine speed (e.g., an APM-requested engine speed) based at least in part on the requested engine speed and the measured engine speed. As illustrated, if the load on the engine 12 is not greater than or equal to a threshold value of approximately 95 percent of a desired or maximum load on the engine 12 (node 78), the PID controller 48 sets (block 80) the APM-requested engine speed equal to a sum of the requested engine speed and an output of the PID controller 48, while setting an input to an Integrator of the PID controller 48 to zero to avoid windup from an engine speed or torque saturation. For example, the PID controller 48 may set the APM-requested engine speed a sum of (1) a difference between the requested speed and the measured speed multiplied by a proportional gain, (2) an integral of the difference multiplied by an integral gain and (3) a differentiation of the difference multiplied by a differential gain as reflected in Equation 1.

$$\text{Engine speed}_{APM\text{-}req} = K_p(\text{Engine speed}_{req} - \text{Engine speed}_{measured}) + \quad (1)$$
$$K_i \int_0^t (\text{Engine speed}_{req} - \text{Engine speed}_{measured}) dt +$$
$$K_d \frac{d(\text{Engine speed }req - \text{Engine speed }measured)}{dt}$$

where
Engine speed$_{APM\text{-}req}$ is an engine speed requested by the APM 50;
$K_p$ is a gain or coefficient for the proportional term;
$K_i$ is a gain or coefficient for the integral term;
$K_d$ is a gain or coefficient for the differentiation term;
Engine speed$_{req}$ is an engine speed requested, for example, the operator of the tractor 10;
Engine speed$_{measured}$ is a measured engine speed; and
t is time.

The APM-requested parameter indicative of engine speed may be referred to as a controller-requested parameter, as the APM 50 is a component of the controller 42. References to the APM-requested engine speed may be considered applicable to the APM-requested parameter indicative of engine speed. If the load on the engine 12 is greater than or equal to the threshold value of approximately 95 percent of a desired or maximum load on the engine 12 (node 78), the PID controller 48 sets (block 82) the APM-requested engine speed equal to a difference between the requested speed and the measured speed multiplied by a proportional gain, as reflected in Equation 2.

$$\text{Engine speed}_{APM\text{-}req} = K_p(\text{Engine speed}_{req} - \text{Engine speed}_{measured}) \quad (2)$$

The load on the engine 12 may be compared to any threshold value of the desired or maximum load on the engine 12. For example, the load on the engine 12 may be compared to between approximately 90 and 100 percent of the desired or maximum load. In some embodiments, the threshold value may be approximately 85, 90, 95, or 100 percent of the desired or maximum load.

If the APM-requested engine speed is greater than a first desired or maximum engine speed of the engine 12 or less than a second desired or minimum engine speed of the engine 12 (node 84), the PID controller 48 determines (block 85) a product of (1) a difference between the APM-requested engine speed before saturation and the APM-requested engine speed after saturation and (2) a saturation gain ($K_s$). The product may be added to an error passing to the Integrator. The method 70 then returns to block 72. If the APM-requested engine speed is not greater than the first desired or maximum engine speed of the engine 12 or less than the second desired or minimum engine speed of the engine 12 (node 84), the PID controller 48 sends (block 86) the APM-requested engine speed to the engine controller 46.

Figure 5:
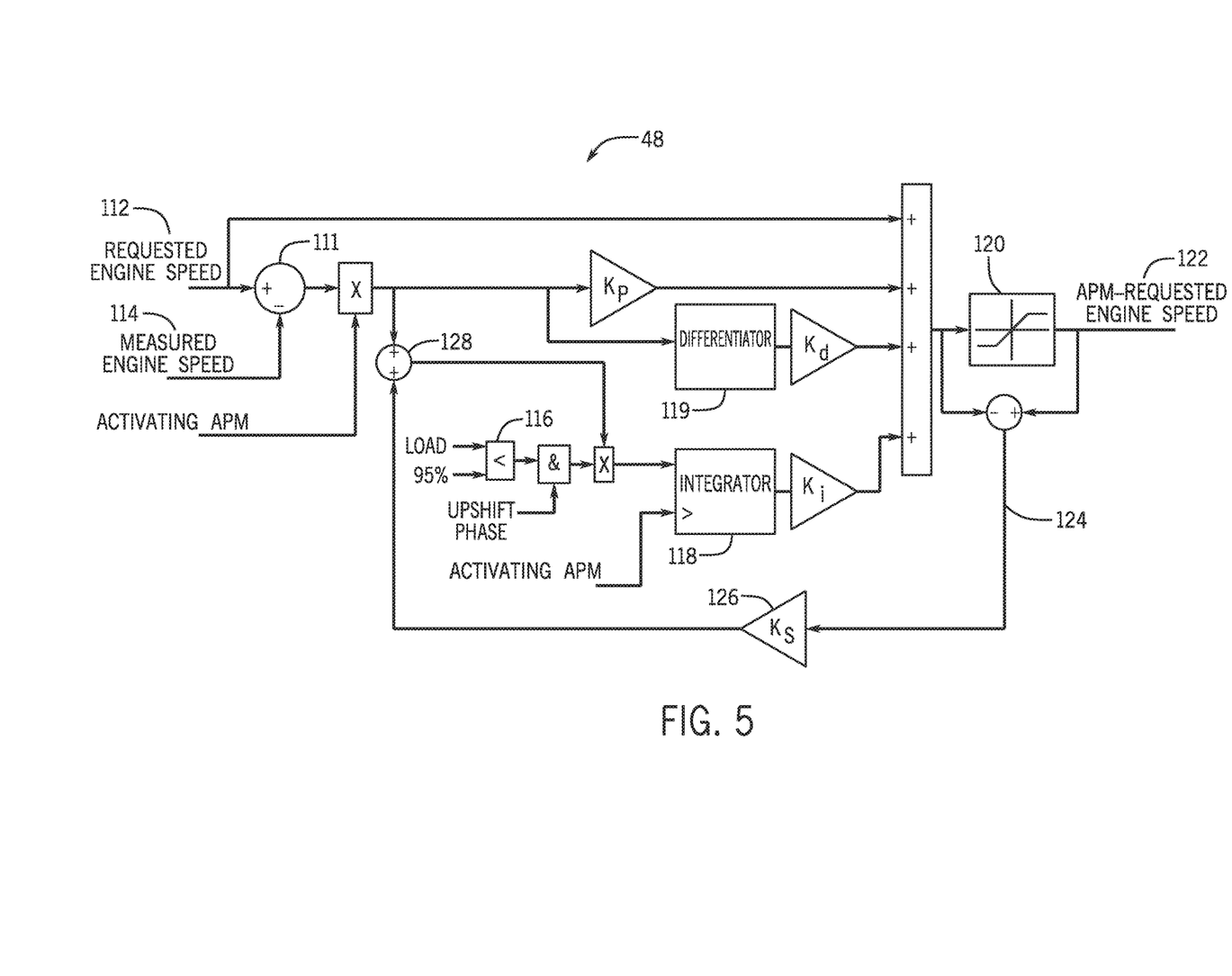
FIG. 5 is a block diagram of a model of a PID controller that employs the anti-windup PID algorithm, in accordance with an embodiment of the present disclosure.

FIG. 5 is a block diagram 110 of the PID controller 48 that employs the anti-windup PID algorithm, in accordance with an embodiment of the present disclosure. The PID controller 48 attempts to maintain an error 111 between the requested engine speed 112 and the measured engine speed 114 close to zero. The model 100 includes a zero switch 116 for the error 111 passing to an Integrator 118. When the load on the engine 12 is more than or equal to a threshold value of approximately 95% of the desired or maximum load, the error 111 is set to zero or the Integrator 118 may maintain the previously integrated error and not integrate as far as the error 111 is zero. This is because torque is saturated on the engine side and any more integration is going to cause a windup (i.e., the error continually increases and overshoots such that a desired or maximum engine speed or desired or maximum load is reached) when the requested engine speed is changing. A controller area network signal provided from the engine 12 (e.g., a "Percentage Load At Current Speed" value on an EEC2 message) may include the load on the engine 12, which may be compared to 95% of the desired or maximum load.

The PID controller 48 also manipulates saturation 120 to ensure that the APM-requested engine speed 122 is not greater than the first desired or maximum engine speed of the engine 12 and not less than the second desired or minimum engine speed of the engine 12. In particular, the PID controller 48 multiplies a feedback signal 124 of the difference between the APM-requested engine speed 122 before and the APM-requested engine speed 122 after saturation by a gain $K_s$ 126. The output of the gain $K_s$ may be added 128 to the error 111 passing to the Integrator 118. This may prevent the Integrator 118 from any windup due to saturation 120. The PID controller 48 also includes a Differentiator 119 that multiplies an output of the Differentiator 119 by a differential gain $K_d$.

For example, an operator of the tractor 10 may request an engine speed (Engine speed$_{req}$) of 1800 RPM. The measured engine speed (Engine speed$_{measured}$) of the tractor 10 may be 1600 RPM. The resultant engine speed requested when using the anti-windup PID algorithm (Engine speed$_{APM\text{-}req}$), such that the measured engine speed is maintained close to the requested engine speed, may be 2500 RPM. However, if the requested engine speed is greater than a first desired or maximum engine speed of the engine 12 or less than a second desired or minimum engine speed, then the PID controller may maintain the error (i.e., the difference between the requested engine speed and the measured engine speed), in an effort to not cause a windup.

Figure 6:
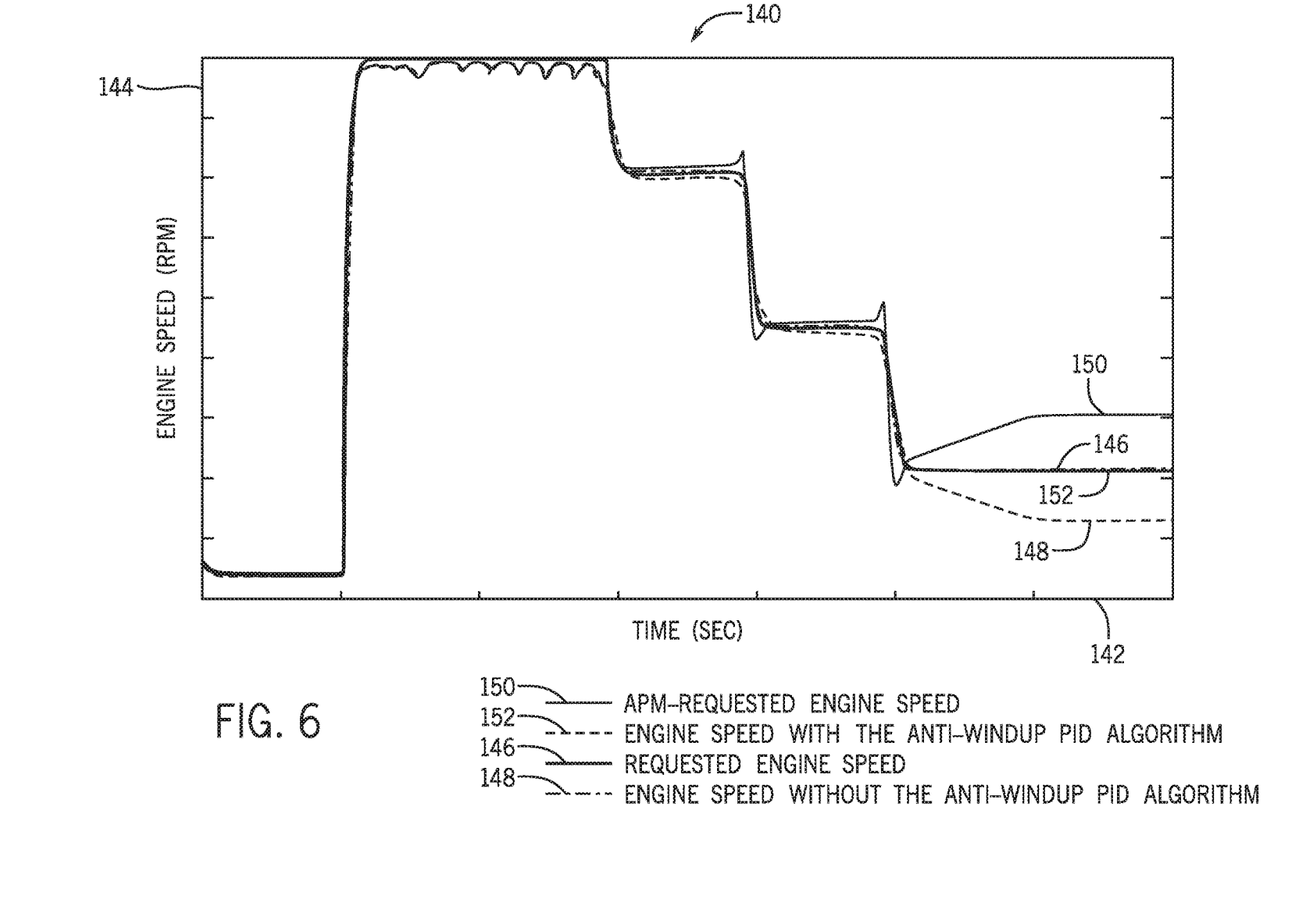
FIG. 6 is a plot of engine speed of an engine of the tractor while the engine is under a high load, in accordance with an embodiment of the present disclosure.
Figure 7:
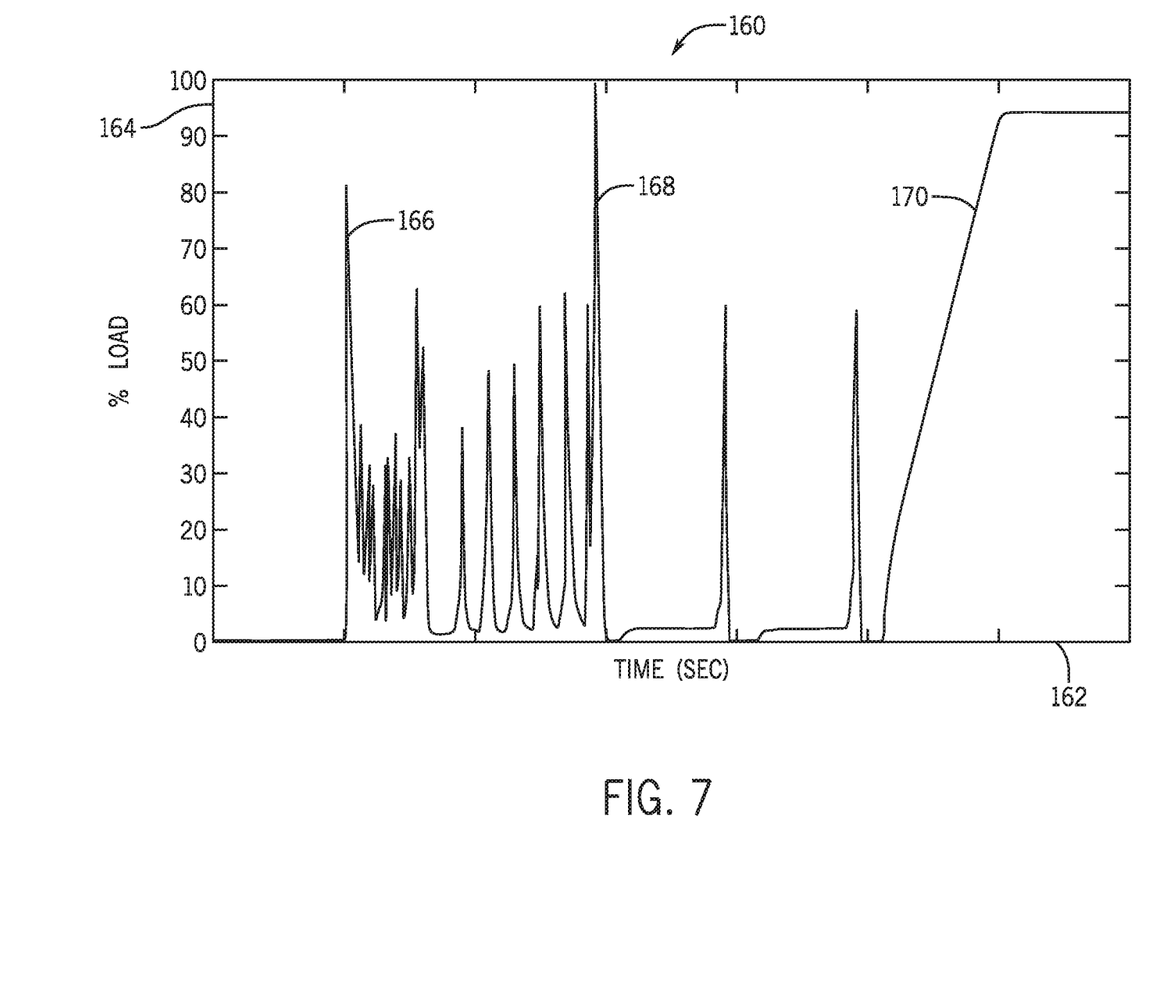
FIG. 7 is a plot of the load that the engine in FIG. 6 is operating under, in accordance with an embodiment of the present disclosure.

FIG. 6 is a plot 140 of engine speed of the tractor 10 while the engine 12 is under a high load, in accordance with an embodiment of the present disclosure. The load on the engine 12 is illustrated in FIG. 7, explained below. The horizontal axis 142 of the plot 140 represents time in seconds and the vertical axis 144 represents engine speed in RPM. A first curve 146 represents the requested engine speed (e.g., by an operator of the tractor 10). The engine speed, as a result of the engine controller 46 sending the requested engine speed 146 to the engine 12, without employing the anti-windup PID algorithm, is illustrated with the second curve 148. A third curve 150 represents the APM-requested engine speed (e.g., by employing the anti-windup PID algorithm). The engine speed, as a result of the engine controller 46 sending the APM-requested engine speed 150 to the engine 12 is illustrated with the fourth curve 152. As desired, the resultant engine speed 152 using the anti-windup PID algorithm is closer to the engine speed 146 requested by the operator than the resultant engine speed 148 without using the anti-windup PID algorithm.

FIG. 7 is a plot 160 of the load that the engine 12 is operating under, in accordance with an embodiment of the present disclosure. The horizontal axis 162 of the plot 160 represents time in seconds and the vertical axis 164 represents the load in percentage of the maximum load on the engine 12. As illustrated, the load 164 is high at multiple times (e.g., at amplitudes 166, 168, 170, etc.).

Figure 8:
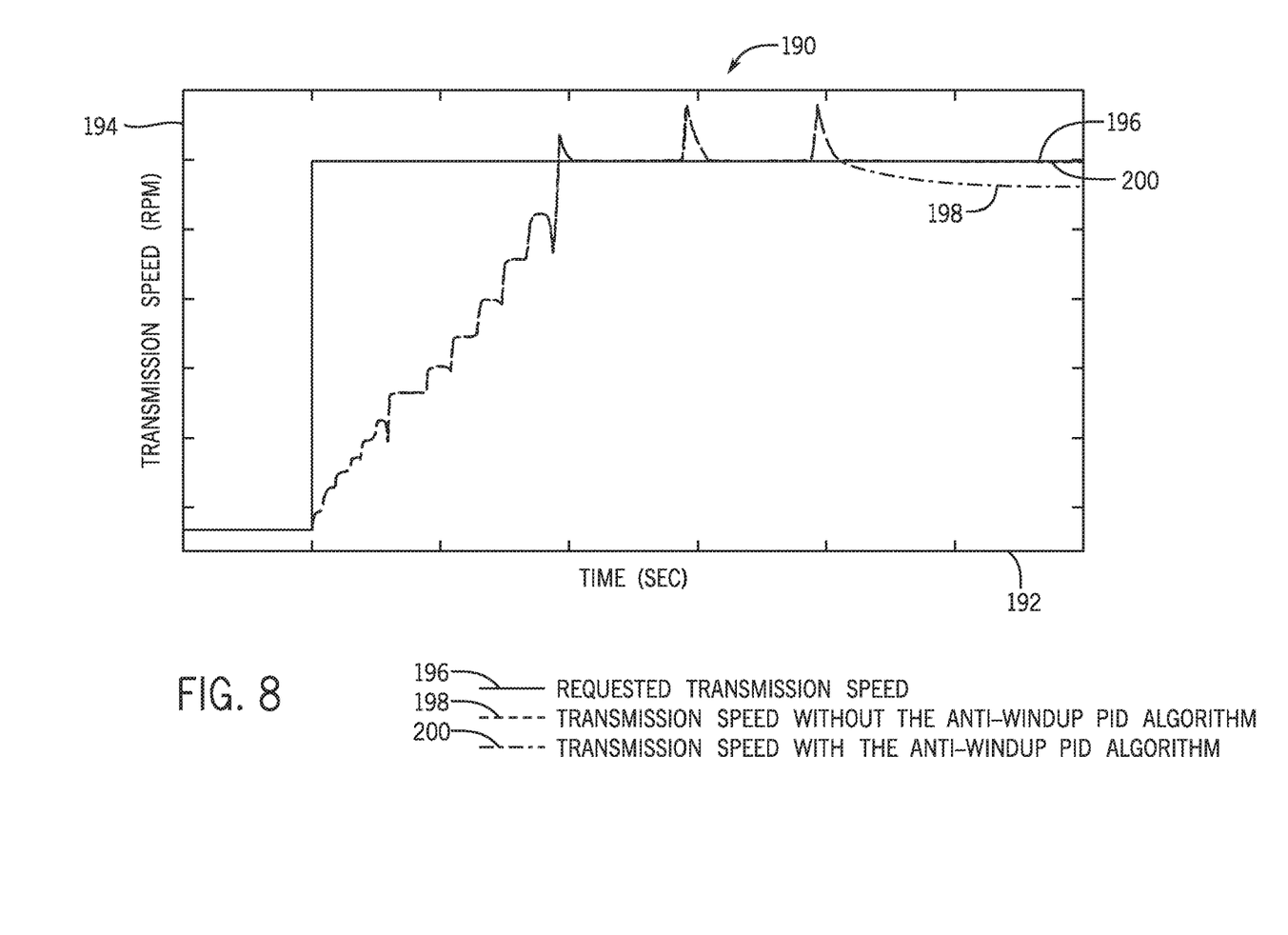
FIG. 8 is a plot of transmission speed of a transmission of the tractor while the engine is under a high load, in accordance with an embodiment of the present disclosure.

FIG. 8 is a plot 190 of the transmission speed of the tractor 10 while the engine 12 is under a high load, in accordance with an embodiment of the present disclosure. The horizontal axis 192 of the plot 190 represents time in seconds and the vertical axis 194 represents the transmission speed in RPM. A first curve 196 represents a requested transmission speed that corresponds to the requested engine speed (e.g., by an operator of the tractor 10). For example, the requested transmission speed may be calculated based on an engaged gear ratio of the transmission 16 and the requested engine speed. The transmission speed, as a result of the engine controller 46 sending the requested engine speed to the engine 12, without employing the anti-windup PID algorithm, is illustrated with the second curve 198. The transmission speed, as a result of the engine controller 46 sending the APM-requested engine speed to the engine 12 is illustrated with the third curve 200. The resultant transmission speed 200 using the anti-windup PID algorithm is closer to the requested transmission speed 196 than the resultant engine speed 198 without using the anti-windup PID algorithm.

Figure 9:
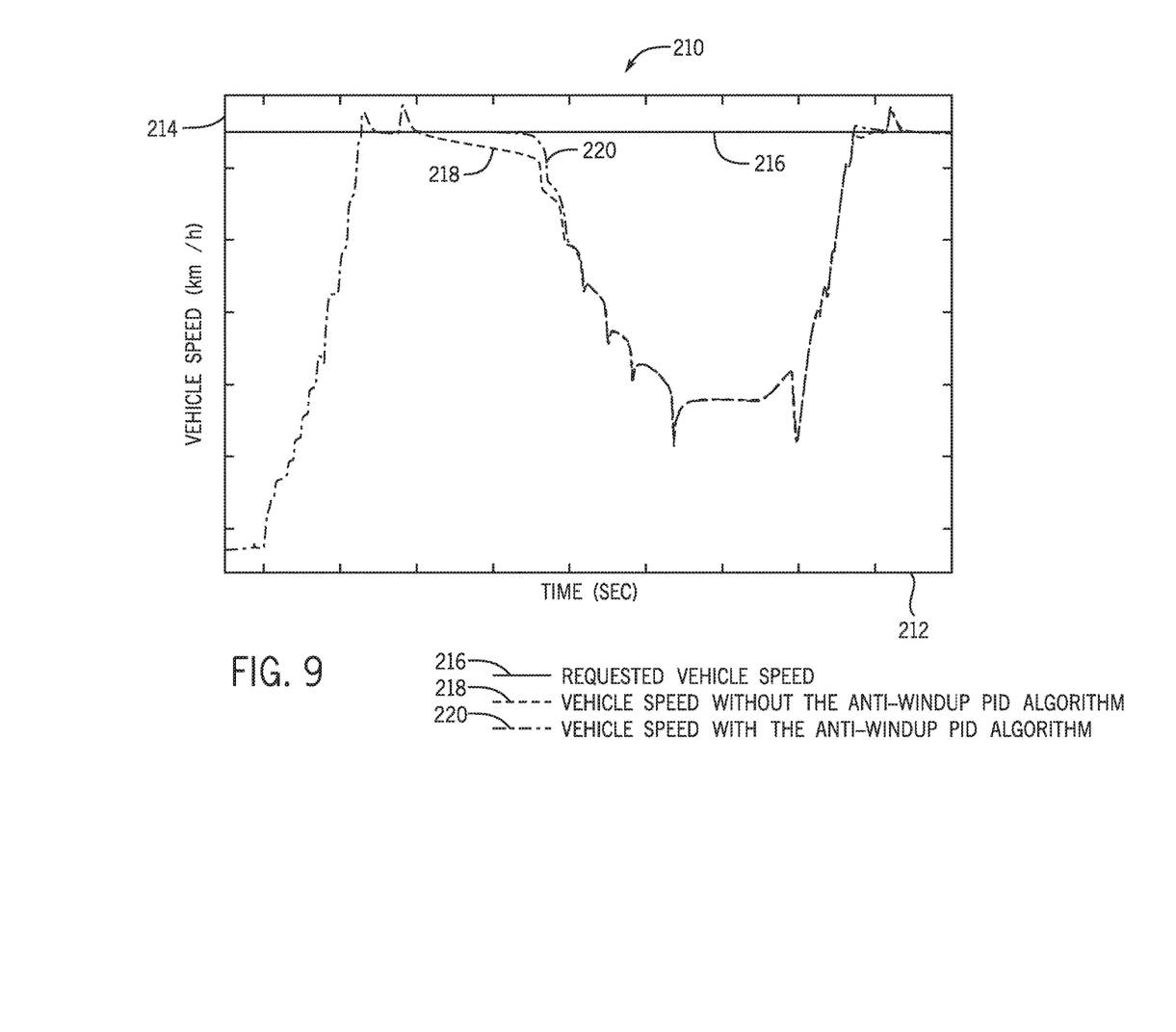
FIG. 9 is a plot of vehicle speed of the tractor while the engine is under a high load, in accordance with an embodiment of the present disclosure.

FIG. 9 is a plot 210 of the vehicle speed of the tractor 10 while the engine 12 is under a high load, in accordance with an embodiment of the present disclosure. The horizontal axis 212 of the plot 210 represents time in seconds and the vertical axis 214 represents the vehicle speed in kilometers per hour (km/h). A first curve 216 represents a requested vehicle speed (e.g., by an operator of the tractor 10). The vehicle speed, as a result of the engine controller 46 sending the requested engine speed to the engine 12, without employing the anti-windup PID algorithm, is illustrated with the second curve 218. The vehicle speed, as a result of the engine controller 46 sending the APM-requested engine speed to the engine 12 is illustrated with the third curve 220. The resultant vehicle speed 220 using the anti-windup PID algorithm is closer to the requested vehicle speed 216 than the resultant vehicle speed 218 without using the anti-windup PID algorithm.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for maintaining an engine speed of an engine of a work vehicle, comprising:
    sending a requested parameter indicative of the engine speed to an engine controller of the work vehicle;
    receiving a measured parameter indicative of the engine speed;
    determining whether the requested parameter is different from the measured parameter;
    in response to determining that the requested parameter is different from the measured parameter, determining whether a load on the engine exceeds a threshold value based on a desired load of the engine;
    in response to determining that the load on the engine exceeds the threshold value, setting a controller-requested parameter indicative of the engine speed to a difference between the requested parameter and the measured parameter multiplied by a proportional gain;
    in response to determining that the load on the engine does not exceed the threshold value, setting the controller-requested parameter to a sum of:
        the difference between the requested parameter and the measured parameter multiplied by the proportional gain;
        an integral of the difference multiplied by an integral gain; and
        a differentiation of the difference multiplied by a differential gain; and
    sending the controller-requested parameter to the engine controller, wherein the engine controller outputs a signal to adjust a throttle of the engine in response to receiving the controller-requested parameter.

2. The method of claim 1, wherein the requested parameter is requested by an operator of the work vehicle.

3. The method of claim 1, wherein the controller-requested parameter is requested by an automotive productivity manager (APM) of a controller of the work vehicle.

4. The method of claim 1, wherein the desired load of the engine comprises a maximum load of the engine.

5. The method of claim 1, wherein the threshold value is approximately 95 percent of a maximum load of the engine.

6. The method of claim 1, wherein sending the controller-requested parameter to the engine controller comprises multiplying a feedback signal of a difference between the controller-requested parameter before and after saturation by a gain.

7. A system of a work vehicle, comprising:
    an engine;
    a controller comprising an engine controller communicatively coupled to the engine, wherein the controller, in operation:
        sends a requested parameter indicative of engine speed to the engine controller;
        receives a measured parameter indicative of engine speed;
        determines whether a load on the engine exceeds a threshold value based on a desired load of the engine;
        in response to determining that the load on the engine does not exceed the threshold value, sets a controller-requested parameter indicative of engine speed to a sum of:
            a difference between the requested parameter and the measured parameter multiplied by a proportional gain;
            an integral of the difference multiplied by an integral gain; and
            a differentiation of the difference multiplied by a differential gain; and
        sends the controller-requested parameter to the engine controller.

8. The system of claim 7, wherein the controller comprises a proportional-integral-differential (PID) controller, wherein the PID controller comprises an automotive productivity manager (APM).

9. The system of claim 8, wherein the APM, in operation, reduces fuel consumption of the work vehicle.

10. The system of claim 8, wherein the APM, in operation, sends the controller-requested parameter to an engine controller of the controller based on the controller-requested parameter, a first desired engine speed, and second desired engine speed.

11. The system of claim 10, wherein the APM, in operation, sends the controller-requested parameter to an engine controller of the controller when an engine speed based on the controller-requested parameter is less than or equal to the first desired engine speed and greater than or equal to the second desired engine speed.

12. The system of claim 11, wherein the first desired engine speed comprises a maximum engine speed.

13. The system of claim 11, wherein the second desired engine speed comprises a minimum engine speed.

14. The system of claim 8, wherein the measured parameter is provided by a sensor communicatively coupled to a shaft of the engine.

15. A controller of a work vehicle, comprising:
   an engine controller communicatively coupled to an engine of the work vehicle;
   a processor communicatively coupled to the engine controller, wherein the controller, in operation:
      determines whether a requested parameter indicative of engine speed is different from a measured parameter indicative of engine speed;
      in response to determining that the requested parameter is different from the measured parameter, determines whether a load on the engine exceeds a threshold value based on a desired load of the engine;
      in response to determining that the load on the engine exceeds the threshold value, sets a controller-requested parameter indicative of engine speed to a difference between the requested parameter and the measured parameter multiplied by a proportional gain; and
      sends the controller-requested parameter to the engine controller, wherein the engine controller outputs a signal to adjust a throttle of the engine in response to receiving the controller-requested parameter.

16. The controller of claim 15, wherein sending the controller-requested parameter to the engine controller comprises multiplying a feedback signal of a difference between the controller-requested parameter before and after saturation by a gain in order to avoid windup from an engine speed saturation.

17. The controller of claim 15 comprising an integrator.

18. The controller of claim 17 comprising a zero switch, wherein setting the controller-requested parameter comprises using the zero switch to pass a difference between the requested parameter and the measured parameter to the integrator.

19. The method of claim 1, wherein an input to the integral of the difference is set to zero.

* * * * *